US011283828B2

(12) United States Patent
Riccetti et al.

(10) Patent No.: US 11,283,828 B2
(45) Date of Patent: Mar. 22, 2022

(54) CYBER-ATTACK VULNERABILITY AND PROPAGATION MODEL

(71) Applicant: International Business Machines Corporation, Armonk, NY (US)

(72) Inventors: Simone Riccetti, Austin, TX (US); Tamer Aboualy, Etobicoke (CA); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 16/745,430

(22) Filed: Jan. 17, 2020

(65) Prior Publication Data

US 2021/0226980 A1 Jul. 22, 2021

(51) Int. Cl.
H04L 29/06 (2006.01)

(52) U.S. Cl.
CPC ...... *H04L 63/1433* (2013.01); *H04L 63/0263* (2013.01); *H04L 63/20* (2013.01)

(58) Field of Classification Search
CPC .. H04L 63/1433; H04L 63/0263; H04L 63/20
USPC .......................................................... 726/25
See application file for complete search history.

(56) References Cited

U.S. PATENT DOCUMENTS

| | | | |
|---|---|---|---|
| 9,015,847 B1 * | 4/2015 | Kaplan | H04L 63/1408 726/25 |
| 9,241,008 B2 * | 1/2016 | Powell | G06F 21/577 |
| 9,507,944 B2 | 11/2016 | Lotem et al. | |
| 9,774,616 B2 | 9/2017 | Flores et al. | |
| 9,954,884 B2 | 4/2018 | Hassell et al. | |
| 10,313,365 B2 | 6/2019 | Jang et al. | |
| 11,036,865 B2 * | 6/2021 | Trepagnier | G06N 20/20 |
| 2014/0109230 A1 * | 4/2014 | Oliphant | H04L 63/1433 726/25 |
| 2014/0137257 A1 * | 5/2014 | Martinez | H04L 63/1433 726/25 |
| 2014/0173739 A1 * | 6/2014 | Ahuja | G06F 21/568 726/25 |

(Continued)

OTHER PUBLICATIONS

Disclosed Anonymously, "Advance Captcha like System for Human Authentication", IP.com Prior Art Database Technical Disclosure, IPCOM000253943D, Electronic Publication Date: May 16, 2018, 5 pages.

(Continued)

*Primary Examiner* — Dant B Shaifer Harriman
(74) *Attorney, Agent, or Firm* — Stephen R. Yoder

(57) ABSTRACT

A method, computer program product and computer system to analyze network vulnerability expansion is provided. A processor receives network infrastructure data regarding a network. A processor identifies a plurality of vulnerabilities associated with one or more components of the network. A processor generates a architecture model based, at least in part, on the network infrastructure data and the plurality of vulnerabilities. A processor generates a vulnerability expansion model based, at least in part, on the architecture model. A processor determines a vulnerability expansion based, at least in part, on the vulnerability expansion model and at least one vulnerability of plurality of vulnerabilities being compromised.

14 Claims, 7 Drawing Sheets

(56) References Cited

U.S. PATENT DOCUMENTS

| | | | | |
|---|---|---|---|---|
| 2015/0040230 | A1* | 2/2015 | Oliphant | H04L 63/20 726/25 |
| 2015/0058993 | A1* | 2/2015 | Choi | G06N 7/005 726/25 |
| 2017/0046519 | A1* | 2/2017 | Cam | G06N 7/005 |
| 2018/0124092 | A1* | 5/2018 | Pope | H04L 63/1433 |
| 2019/0052665 | A1* | 2/2019 | Mahieu | G06N 3/04 |
| 2020/0296137 | A1* | 9/2020 | Crabtree | H04L 63/1433 |
| 2021/0126936 | A1* | 4/2021 | Gerber, Jr. | G06N 20/00 |
| 2021/0273967 | A1* | 9/2021 | Vela | H04L 63/1416 |

OTHER PUBLICATIONS

Disclosed Anonymously, "Advanced Endpoint Security Advisor (AESA)", IP.com Prior Art Database Technical Disclosure, IPCOM000250629D, Electronic Publication Date: Aug. 10, 2017, 5 pages.

Disclosed Anonymously, "Analytic Forecasting of Future Electronic Cyber Threats with Deep Learning and Coevolutionary Strategies", IP.com Prior Art Database Technical Disclosure, IPCOM000243925D, Electronic Publication Date: Oct. 28, 2015, 6 pages.

Disclosed Anonymously, "System and Method for Proactive Determination of Potential Site Failures", IP.com Prior Art Database Technical Disclosure, IPCOM000258486D, Electronic Publication Date: May 16, 2019, 4 pages.

Draeger, et al., "Simulation-based Unified Risk Assessment for Safety and Security", arXiv:1709.00567v2 [cs.SY] Jan. 7, 2019, 24 pages.

Harms, Andre, "Cyber resilience analysis using malware spread simulation", Hamburg University of Applied Sciences, Master's Thesis, Submitted Apr. 1, 2014, 94 pages.[Machine Translated].

Jajodia et al., "Advanced Cyber Attack Modeling, Analysis and Visualization", George Mason University, AFRL-RI-RS-TR-2010-078, Final Technical Report, Mar. 2010, 113 pages.

Kotenko, et al., "A Cyber Attack Modeling and Impact Assessment Framework", 2013 5th International Conference on Cyber Conflict, © NATO CCD COE Publications, Tallinn, 24 pages.

Reed et al., "Simulation of Workflow and Threat Characteristics for Cyber Security Incident Response Teams", Research Gate, Conference Paper, Oct. 2014, 7 pages.

Santos et al., "Method of Automated Cyber Risk Assessment, Insurance Underwriting, and Remediation", IP.com Prior Art Database Technical Disclosure, IPCOM000250702D, Electronic Publication Date Aug. 23, 2017, copyright © 2017 Cisco Systems, Inc., 8 pages.

Yeboah-Ofori, et al., "Cyber Security Threat Modeling for Supply Chain Organizational Environments", Future Internet 2019, 11, 63, Published: Mar. 5, 2019, 25 pages.

Transmittal Form PTO/SB/21, Dated Feb. 4, 2020, 2 Pages.

* cited by examiner

CYBER-ATTACK VULNERABILITY AND PROPAGATION MODEL

BACKGROUND OF THE INVENTION

The present invention relates generally to the field of computer security, and more particularly to vulnerability assessment in a network.

Modern networks comprise a variety of devices that may be vulnerable to cyber-attacks. Vulnerabilities of a device are flaws, weaknesses, exploits or any method that may be used to give attackers control of the device. In some cases, a compromised device can lead to other devices in the network that can be further compromised, which provide the attackers with increasingly more control over the network which each compromised device. This type of cyber-attack approach is often referred to a "land and expand" or "lateral movement" attacks.

SUMMARY

Embodiments of the present invention provide a method, computer system, and computer program product to analyze network vulnerability expansion. A processor receives network infrastructure data regarding a network. A processor identifies a plurality of vulnerabilities associated with one or more components of the network. A processor generates a architecture model based, at least in part, on the network infrastructure data and the plurality of vulnerabilities. A processor generates a vulnerability expansion model based, at least in part, on the architecture model. A processor determines a vulnerability expansion based, at least in part, on the vulnerability expansion model and at least one vulnerability of plurality of vulnerabilities being compromised.

DETAILED DESCRIPTION

Figure 1:
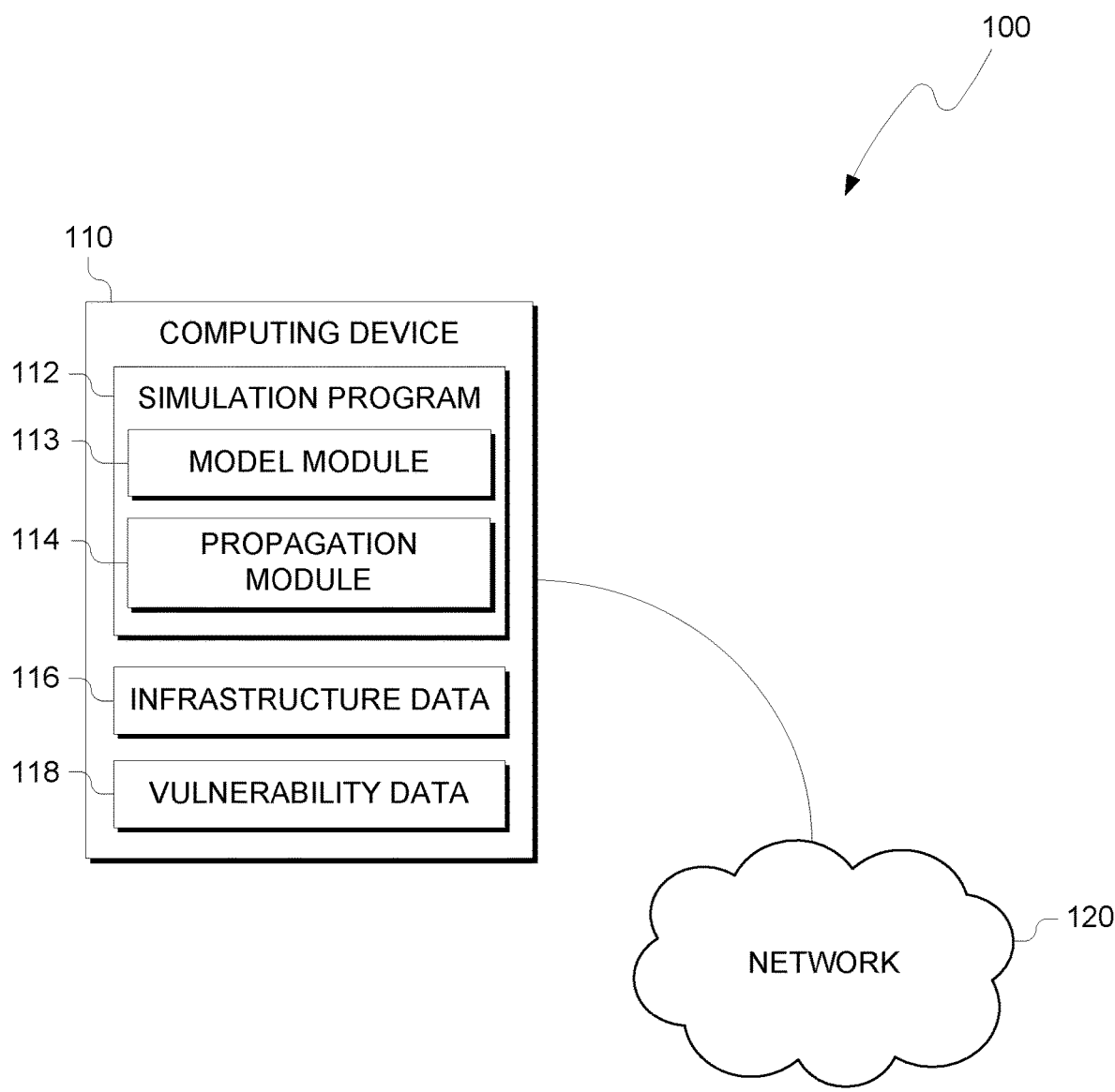
FIG. 1 is a functional block diagram illustrating a cyber-attack simulation environment, in accordance with an exemplary embodiment of the present invention.

While solutions to cyber-attack modeling and simulation are known, prior solutions typically only address endpoint devices and security. While the vulnerabilities of a single system or device may be identified by prior solutions, the effect the compromised system can have on a network is typically not addressed. Additionally, prior solutions require active testing and attacks on the devices in the network. In some networks, "mission critical" servers and devices cannot be tested since such attacks, although benign for testing purposes, can lead to system instability and, consequently, impact services of the network. Embodiments of the present invention recognize that by providing a model for both vulnerability interaction and propagation in a network, that cyber-attack testing and modeling can be provided that addresses vulnerability expansion in a network without directly compromising the network as with traditional security testing techniques. Furthermore, prior solutions of cyber-attack analysis typically place an inherent trust for some device, assuming that certain devices and systems of the network are trustworthy or are not exploitable. Embodiments of the present invention recognize that by modeling attack expansion by all possible vulnerabilities or exploits in a network that attack vectors can be determined that previous solutions would not find during a simulated cyber-attack.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a computing environment, generally designated 100, in accordance with one embodiment of the present invention. Computing environment 100 includes computing device 110 connected over network 120. Computing device 110 includes simulation program 112, with model module 113 and propagation module 114, infrastructure data 116 and vulnerability data 118.

In various embodiments of the present invention, computing device 110 can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to infrastructure data 116 and vulnerability data 118 and is capable of executing simulation program 112. Computing device 110 may include internal and external hardware components, as depicted and described in further detail with respect to FIG. 7.

In this exemplary embodiment, simulation program 112, model module 113, propagation module 114, infrastructure data 116 and vulnerability data 118 are stored on computing device 110. However, in other embodiments, simulation program 112, model module 113, propagation module 114, infrastructure data 116 or vulnerability data 118 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 110 and other devices (not shown), in accordance with a desired embodiment of the present invention.

In various embodiments, simulation program 112 receives infrastructure data 116, which includes information describing the configuration of a particular network. Infrastructure data 116 includes information indicating the components of a network such as the devices (e.g., endpoints, servers, databases and the like), network infrastructure such as hardware (e.g., routers, switches and the like) and network services (e.g., firewall, monitoring devices and the like). Infrastructure data 116 also includes connection information that indicates how the various devices and infrastructure are interconnected which indicate various subnets or zones of the network. For each device and network infrastructure and services, infrastructure data 116 also includes information indicating the configuration of each device and other network infrastructure and services such as, but not limited to, operating system, installed software, firewall or security rules, and any other information that indicates how each device or network infrastructure or service is configured.

Figure 4:
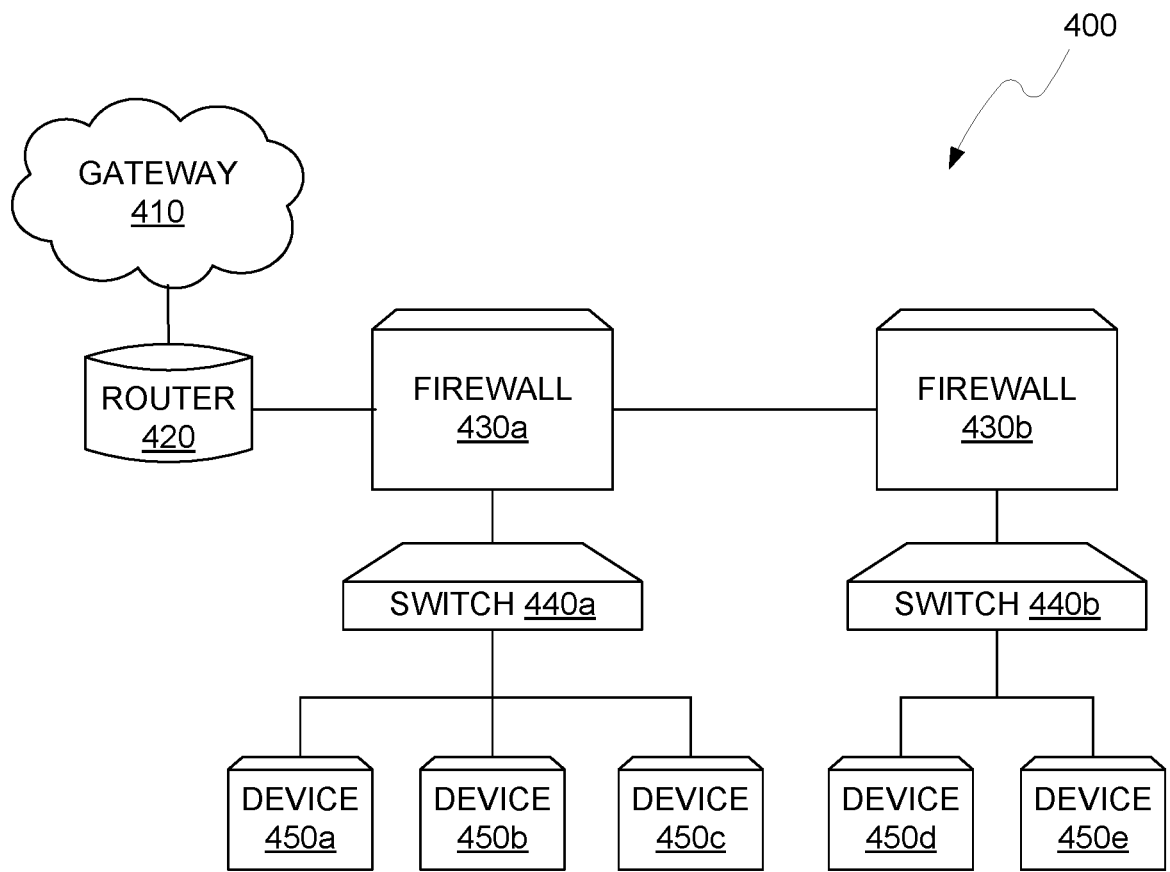
FIG. 4 depicts a non-limiting example network configuration.

FIG. 4 depicts a non-limiting example network configuration 400 which includes network components such as gateway 410, router 420, firewalls 430a-b, switches 440a-b and devices 450a-e. Example network configuration 400 also indicates the interconnections between the components (e.g., devices 450a-c are connected to switch 440a). Infrastructure data 116 includes data that indicates the components and any connections to other components based on such information as presented by example network configuration 400. Additionally, infrastructure data 116 also includes component configuration data that indicates how each of the components (e.g., gateway 410, router 420, firewalls 430a-b, switches 440a-b and devices 450a-e) are configured (e.g., operating system, version, installed software, firewall rules, etc.). One of ordinary skill in the art will appreciate that infrastructure data 116 may include many different forms of representation for networks and their components, such a network diagram (i.e., as example network configuration 400) or any other modeling language or diagram, without deviating from the invention.

Referring back to FIG. 1, simulation program 112 identifies one or more vulnerabilities of components of the network based of infrastructure data 116, in various embodiments. Vulnerability data 118 is determined based on a vulnerability assessment of the network and the network's components. Based on the assessment, one or more vulnerabilities of the network are identified. The vulnerabilities indicate known exploits, weaknesses or other potential vectors that an attacker may utilize to compromise the network. In some embodiments and scenarios, simulation program 112 provides a vulnerability assessment of the network by scanning the various components of the network or performing a penetration test of the network, thereby identifying vulnerabilities of the network. In other embodiments and scenarios, vulnerability assessment and penetration tests are performed by another entity, and simulation program 112 is provided the vulnerabilities of the network. In another embodiment, simulation program 112 analyzes infrastructure data 116 to identify vulnerabilities of the network. For example, simulation program 112 analyzes the configurations of network components. If a component is configured in manner that would result in potential attack vector (e.g., a component has an outdated version of software installed), then simulation program 112 identifies the vulnerability, storing the identified vulnerable component in vulnerability data 118.

In various embodiments, model module 113 of simulation program 112 generates a architecture model based on infrastructure data 116 and vulnerability data 118. The architecture model includes representations of various components, such as zones of the network and endpoint devices, as well as network configurations, such as firewall rules, and the various communication paths data may migrate across the network. For each node that has an identified vulnerability in vulnerability data 118, simulation program 112 includes a connected vulnerability to the associated node in the architecture model.

Figure 5:
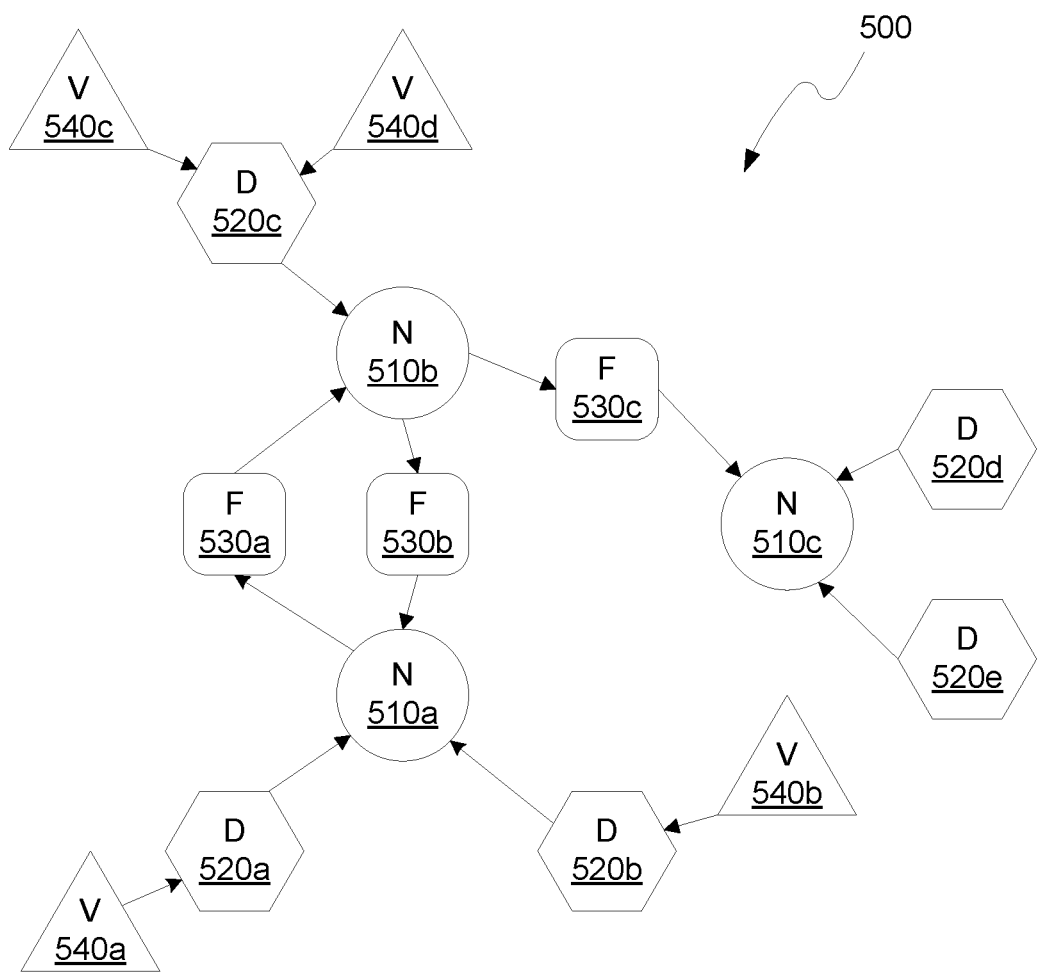
FIG. 5 depicts a non-limiting example architecture model.

FIG. 5 depicts a non-limiting example architecture model 500 which is depicted as a directed graph of nodes and communication paths between the nodes. Architecture model 500 includes network zones N510a-c, devices D520a-c, firewalls F530a-c and vulnerabilities V540a-d. The directed paths of architecture model 500 indicate communication paths between the various nodes. For example, networks N510a and N510b communicate through two separate firewalls, F530a and F530b, that have different sets of rules for traffic between networks N510a and N510b. As will become apparent to one of ordinary skill in the art based on the following, the directed graph and separation of communication paths as depicted in architecture model 500 provides additional information that improves the modeling and determination of vulnerability expansion within a network.

Referring back to FIG. 1, model module 113 of simulation program 112 generates a architecture model based on infrastructure data 116 and vulnerability data 118. Based on infrastructure data 116, model module 113 generates the nodes of the architecture model for each identified network or zone (e.g., network zones N510a-c of FIG. 5), device or system of the network (e.g., devices D520a-c of FIG. 5), and firewalls (e.g., firewalls F530a-c of FIG. 5). Furthermore, model module 113 generates nodes for each identified vulnerability in vulnerability data 118. Based on the vulnerability and the zone, device or firewall that is associated with the vulnerability, model module 113 connects a vulnerability node to the node with the associated vulnerability (e.g., V540a is a vulnerability associated with device D520a as depicted in FIG. 5).

Additionally, model module 113 connects nodes of the architecture model based on infrastructure data 116. For example, systems and devices for a zone are connected to the respective zone (e.g., D520d and D520e are devices of network N510c as depicted in FIG. 5), with directed paths leading to the respective zone from the devices. Model module 113 determines directed paths between zones are based on routing configurations of the network and can be provided in infrastructure data 116 or by network inspection of traffic. Model module 113 determines directed paths for firewalls based on the rules and configuration of the firewalls as provided in infrastructure data 116.

In some embodiments and scenarios, the architecture model also includes one or more trust relationships of the various devices, systems and components of the network. Based on permissions, firewall rules and other network configurations, model module 113 includes additional path information for the directed graph which indicates if two interconnected devices or systems have a configuration for trusted communication, even if the devices are parts of different zones or networks. Some networks have trusted relationships between zones that often relax security (e.g., less strict firewall rules) to permit more efficient communication between users of different zones or domain. Such trusted relationships often serve as attack vectors for malicious actors. Therefore, as will become apparent to one of ordinary skill based on the following, simulation program 112 includes trusted relationships to further model potential cyber-attack expansion in the network.

In various embodiments, propagation module 114 of simulation program 112 generates a vulnerability expansion model based on the architecture model generated by model module 113. The vulnerability expansion model is a directed graph model with only the vulnerabilities of the network included as nodes. The directed paths of the vulnerability expansion model indicate the paths of access that each vulnerability may gain if exploited in an attack. For example, if a vulnerability being compromised on one device provides access to another vulnerability to another device, the two vulnerabilities are connected in the vulnerability expansion model.

Figure 6:
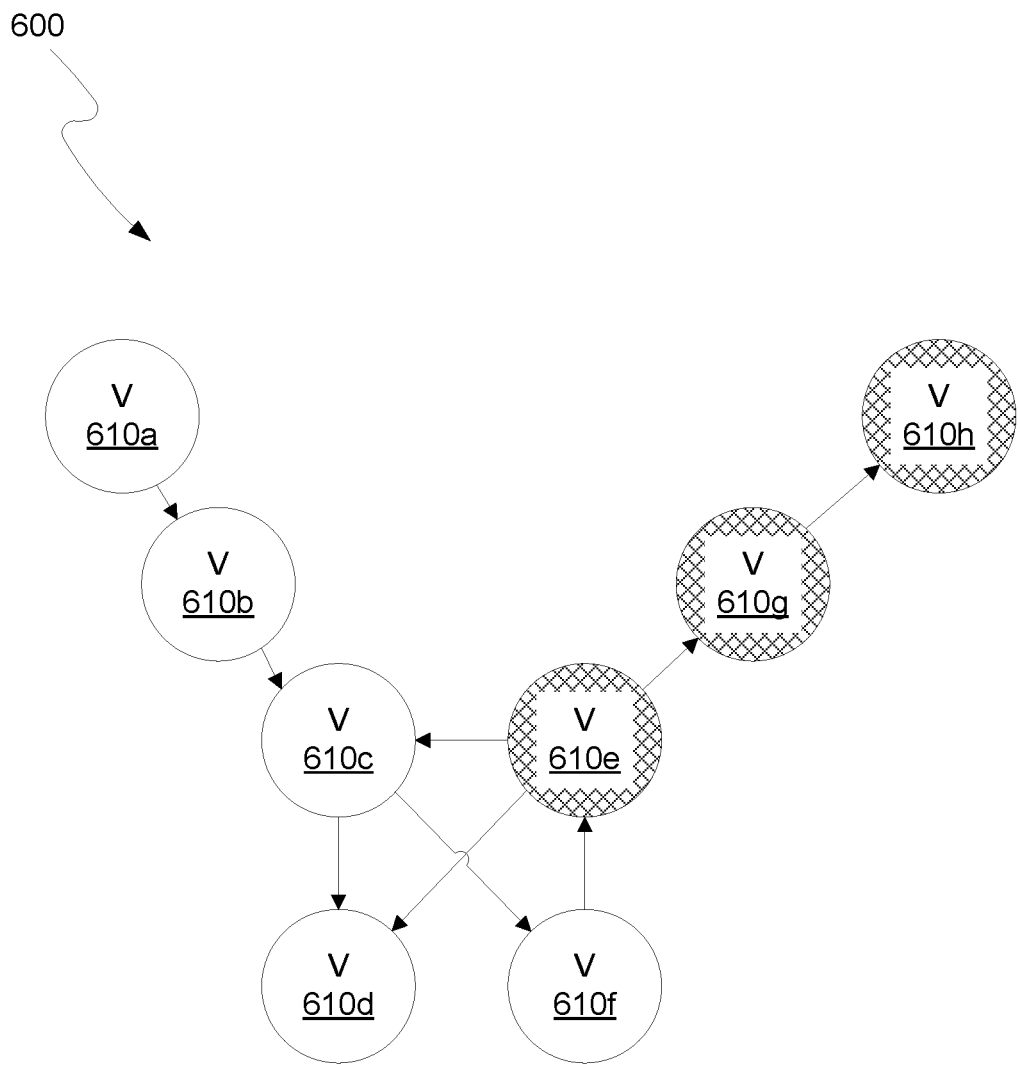
FIG. 6 depicts a non-limiting example vulnerability expansion model.

FIG. 6 depicts a non-limiting example vulnerability expansion model 600 with vulnerabilities V610a-h. Each of the vulnerabilities V610a-h are vulnerabilities in a corresponding network as indicated in vulnerability data 118, that has a network relationship modeled in network mode, as discussed herein. The connected paths indicate the expansion of compromised vulnerabilities that may occur if a given vulnerability node is compromised. As an example, simulation program 112 identifies a first vulnerability for a host device, which is represented as V610e in vulnerability expansion model 600. Based on a firewall service configuration for the host device, another host device can be compromised by another vulnerability of the second host device, which is represented as V610g in vulnerability expansion model 600. The second host device also has another vulnerability, V610h, based on raised escalation privileges of the now compromised second host device by way of V610g, creating an expansion path showing the two compromised devices based on the path of three vulnerabilities V610e-h.

Referring back to FIG. 1, one of ordinary skill in the art will appreciate that the vulnerability expansion model helps model cyber-attacks where malicious actors slowly compromise parts of a network overtime in order to gain more access. Prior solutions typically model concentrated attacks on a network and often do not identify the types of attack vectors that the vulnerability expansion model generated by simulation program 112 provides. As such, the types of vulnerabilities in these types of cyber-attacks typically are left open and not noticed other vulnerability assessment solutions.

In various embodiments, propagation module 114 of simulation program 112 generates a set of what-if scenarios that assume certain vulnerabilities are achieved by an attacker, and then models the expansion of those compromised vulnerabilities, as discussed herein. Such analysis by propagation module 114 of simulation program 112 can identify how much of a network can be comprised from one or more vulnerabilities, as well as the importance or criticality of the vulnerabilities in a network. If a first vulnerability leads to greater access than second vulnerability, then the first vulnerability may be more critical to address.

For each of the what-if where one or more vulnerabilities are assumed to be compromised in the vulnerability expansion model, propagation module 114 of simulation program 112 determines a criticality rating for each vulnerability. For a given vulnerability, a criticality rating $C_{VX}$, can be determined based on the following:

$$C_{VX} = \sum_{k=0}^{n} IC_X * D_V * P_X * E_X$$

In the above equation, $C_{VX}$ is the criticality rating for vulnerability V that is present on device X. $C_{VX}$ is a summation of each of the flowing for all devices that can be compromised if X is compromised. For each additional compromised device, an $IC_X$, $D_V$, $P_X$, and $E_X$ is determined. $IC_X$ is the intrinsic criticality of the additional compromised device. If a device, or services provided by said device, is critical to the network operators, then $IC_X$ is a larger value than a less critical device of the network. $D_V$ is a value corresponding to the detectability of the vulnerability being compromised. If a compromised vulnerability is difficult to detect, then $D_V$ is a greater value for the vulnerability when compared to a system with a more easily detected compromised vulnerability. $P_X$ is a rating of the extent the additional device is compromised. For a vulnerability that provides greater access to a system (e.g., root access to a file system), $P_X$ is a greater value than another system with a vulnerability that has less access (e.g., only read access to the file system). $E_X$ is a rating of the difficulty to compromise the additional vulnerability. If a vulnerability is easily exploitable with simple tools or techniques (e.g., plain text storage of sensitive information), $E_X$ is a greater value than another vulnerability that is more difficult to exploit.

Based on the criticality rating for a vulnerability, simulation program 112 determines one or more configuration changes to the network. Simulation program 112 identifies vulnerabilities with criticality ratings that either exceed a threshold value or a set of vulnerabilities that have the greatest criticality ratings. Based on the selected critical vulnerabilities, simulation program 112 provides a report to network administrators that suggests which vulnerabilities to address, suggesting vulnerabilities with greater criticality ratings prior to less critical vulnerabilities. Additionally, simulation program 112 provides suggested or known fixes to the vulnerabilities. By addressing the more critical vulnerabilities on a network, administrators can improve network security quickly and with greater impact that typical vulnerability assessment solutions.

Figure 2:
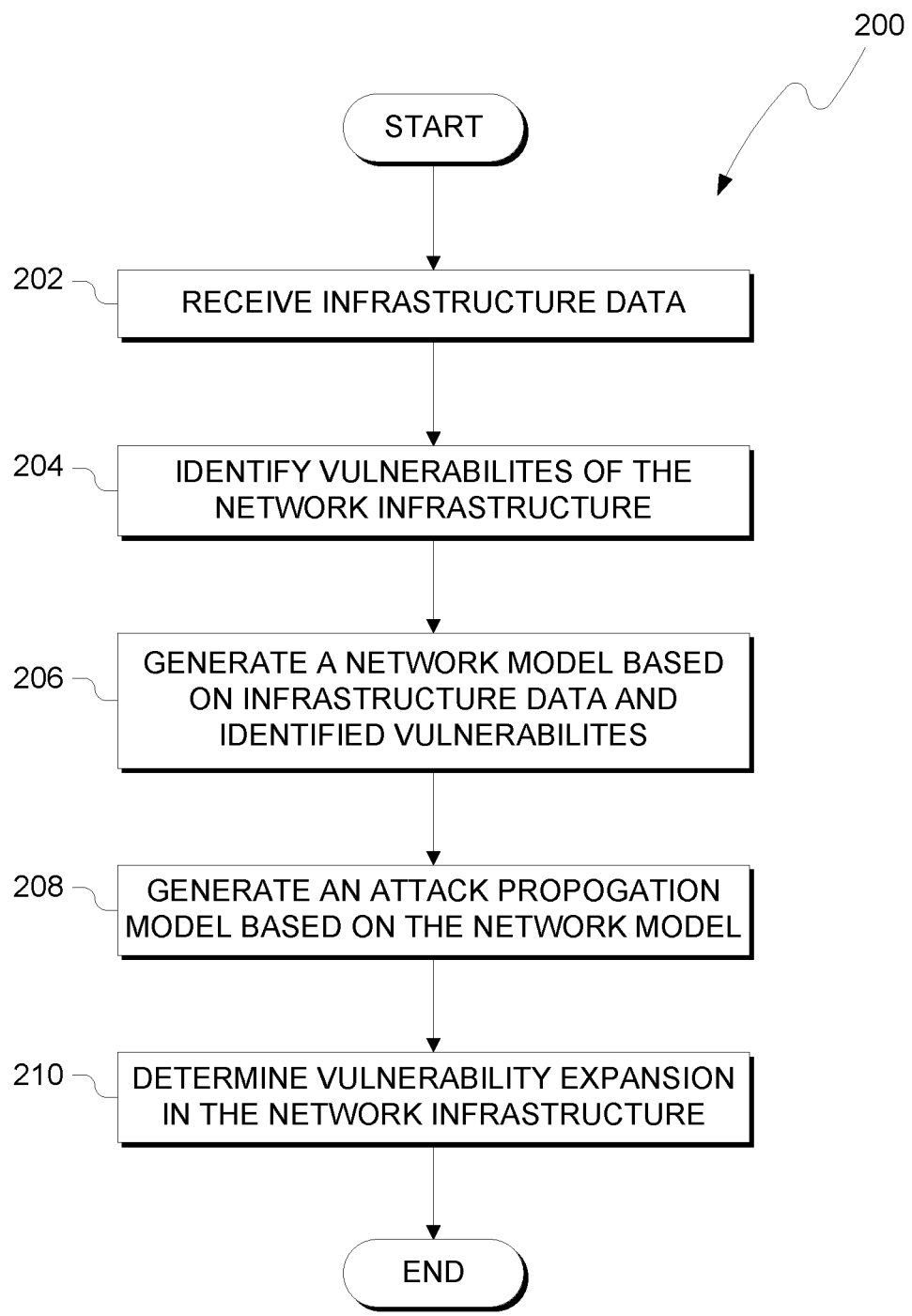
FIG. 2 illustrates operational processes of a simulation program determining vulnerability propagation in a network, on a computing device within the environment of FIG. 1, in accordance with an exemplary embodiment of the present invention.

FIG. 2 illustrates operational processes, generally designated 200, of simulation program 112 determining vulnerability propagation in a network. In process 202, simulation program 112 receives infrastructure data 116 regarding a network. Infrastructure data 116 includes, but is not limited to, components, devices and services of the network, the configurations of the components, devices and services (e.g., operating systems, installed software, firewall rules and the like) and the connections or communication paths of the components and devices of the network (e.g., network zones or subnets of the components, devices and services of the network).

In process 204, simulation program 112 identifies vulnerabilities of the network infrastructure based on the received infrastructure data 116 regarding the network. In some embodiments and scenarios, infrastructure data 116 includes previously determined vulnerabilities of the network infrastructure that were identified in a vulnerability assessment. In other embodiments and scenarios, infrastructure data 116 identifies vulnerabilities based on the infrastructure data 116 received in process 202. Based on the specific components or services provided in infrastructure data 116, or the configuration of said components or services, simulation program 112 identifies vulnerabilities of the network infrastructure based on the components or services matching known components or services that have been identified as having certain vulnerabilities. For example, if a device with a version of an operating system with known vulnerabilities is present in infrastructure data 116, then simulation program 112 identifies that the device has the associated known vulnerabilities. In various embodiments, simulation program 112 stores the identified vulnerabilities as vulnerability data 118.

In process 206, simulation program 112 generates an architecture model based on the infrastructure data 116 and vulnerability data 118 of the network. The architecture model is a directed graph model that includes nodes for the each of the zones, devices, and firewalls present in the network as represented by infrastructure data 116. Additionally, simulation program 112 adds nodes for each identified vulnerability to the respective devices of the network with said vulnerability. The paths of the architecture model are determined based on the configuration of the zones and firewall present in infrastructure data 116. Referring back to FIG. 5, the non-limiting example architecture model 500 depicts an architecture model with nodes for the each of the zones, devices, and firewalls, as well as each identified vulnerability to the respective devices of the network.

In process 208 of FIG. 2, simulation program 112 generates a vulnerability expansion model based on the architecture model generated in process 206. The vulnerability expansion model includes nodes only for the identified vulnerabilities (process 204) that are interconnected in a similar communicative manner as indicated in the architecture model (process 206) (e.g., where the communication paths of the vulnerability expansion model have similar directionality as the architecture model). Referring back to FIG. 6, the non-limiting example vulnerability expansion model 600 depicts directed graph model with nodes for as identified vulnerability, with the paths of the vulnerability expansion model 600 being based on the paths of the architecture model generated in process 206.

In process 210, simulation program 112 determines vulnerability expansion model based on the vulnerability expansion model of process 208 as well as one or more what-if scenarios. In various scenarios, simulation program 112 selects one or more vulnerabilities in the vulnerability expansion model to be selected as compromised, where the vulnerability is assumed to be utilized in a potential cyber-attack scenario. Based on the node being compromised, simulation program 112 determines if any other vulnerability nodes in the vulnerability expansion model would also become compromised based on the access and services that the initial compromised vulnerability provides to a potential cyber-attack.

For example, regarding example vulnerability expansion model 600 of FIG. 6, the example vulnerability expansion model 600 has at least three vulnerability nodes, two vulnerabilities are associated with a first device (i.e., V610g and V610h) and another vulnerability is associated with a second device of the network (i.e., V610e). Based on the vulnerability second device being assumed to be compromised by simulation program 112 (i.e., the hashed visualization of V610e), simulation program 112 determines the connected vulnerability of the second device V610g based on the access the initial vulnerability provides. Additionally, simulation program 112 determines that V610h of the same device is also compromised due to the access that V610g provides. In this non-limiting example, V610c is not compromised, even though a communication path present in the example vulnerability expansion model 600. Some scenarios may be present where the access provided by a compromised vulnerability may not provide the proper access to exploit other vulnerabilities. However, another scenario may be evaluated by simulation program 112 where both V610b and V610e are both assumed compromised, which would provide the necessary access to exploit vulnerability 610c. Based on the various what-if scenarios, simulation program 112 determines how vulnerabilities can be exploited to gain additional access in a network via other vulnerabilities.

Referring back to FIG. 2, one of ordinary skill in the art will appreciate that based on the various what-if scenarios of vulnerability expansion determined in process 210, simulation program 112 can provide analysis of how attacks can propagate through a network via various vulnerabilities, as well as determine the impact of or how critical a vulnerability is, based on the number of other vulnerabilities the initial vulnerability provides by such analysis.

Figure 3:
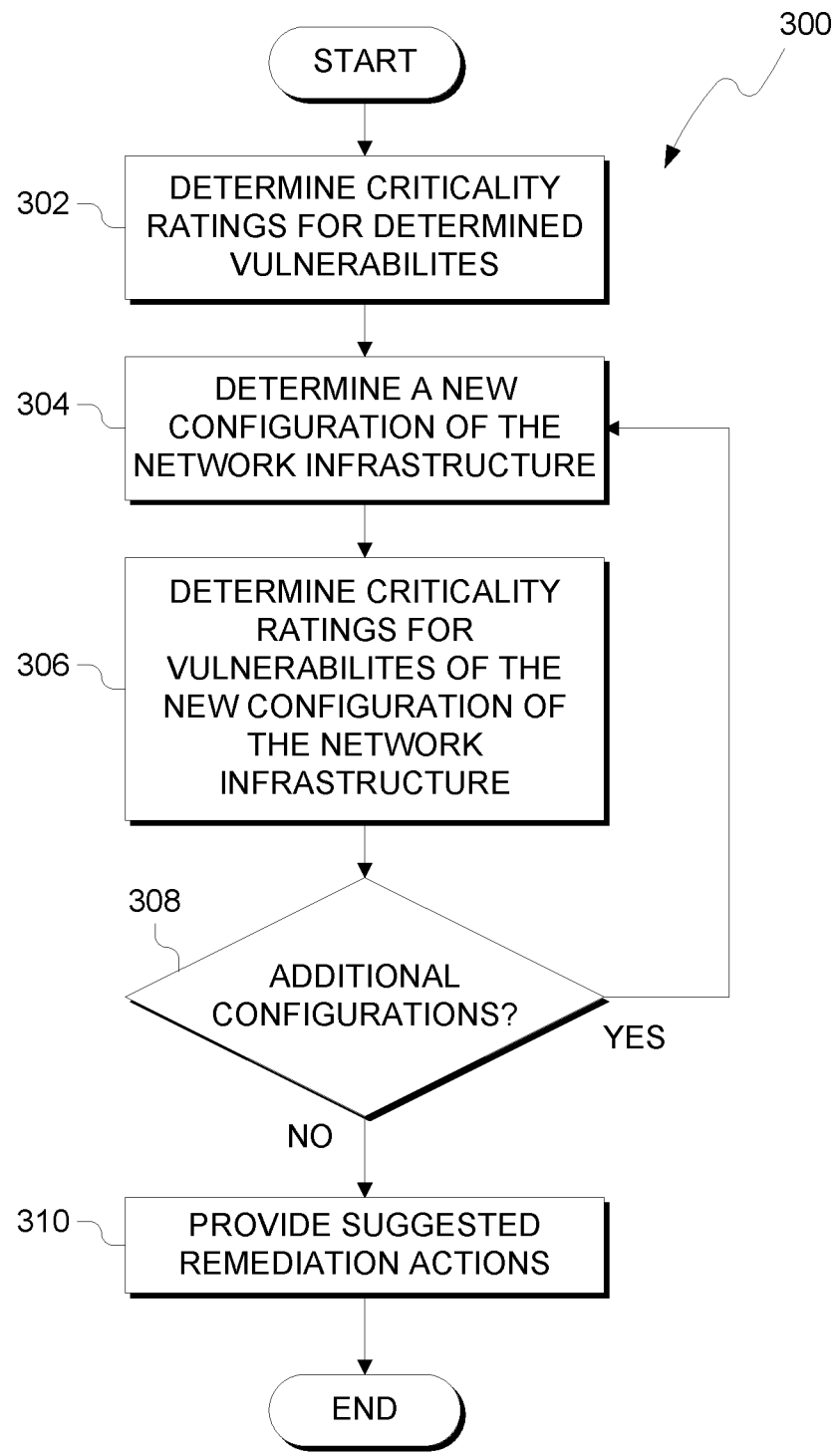
FIG. 3 illustrates operational processes of a simulation program determining reconfigurations to address critical vulnerabilities of a network, on a computing device within the environment of FIG. 1, in accordance with an exemplary embodiment of the present invention.

FIG. 3 illustrates operational processes, generally designated 300, of simulation program 112 determining reconfigurations to address critical vulnerabilities of a network. In process 302, simulation program 112 determines a criticality rating for each vulnerability. Simulation program 112 generates a variety of scenarios where one or more vulnerability nodes of the vulnerability expansion model are compromised. Based on this initial assumption, the expansion of the vulnerabilities in the network as discussed herein regarding FIG. 2. For each additional vulnerability that is gained, simulation program 112 determines a criticality rating for the initial vulnerabilities in the analysis, increasing for each additional vulnerability that may be gained in an attack from the initial vulnerabilities being assumed compromised, as well as additional factors such as discussed herein regarding the criticality rating of each node.

In process 304, simulation program 112 changes one or more configurations of devices or components of the network. For example, simulation program 112 selects a change or update to software for a device or adds a new firewall rule to the architecture model, resulting in a new vulnerability expansion model (e.g., processes 206 and 208 of FIG. 2). Based on this new configuration, and resulting model changes, simulation program 112 determines a new criticality rating for the potential new configuration of the network's components and devices (process 306). In decision process 308, simulation program 112 repeats the testing for changes to the criticality ratings of vulnerabilities (processes 304-306) based on additional configurations to be tested (YES branch of process 308). Once no more additional configurations are left to be simulated (NO branch of process 308), then simulation program 112 provides suggested remediation actions or changes to the network infrastructure and devices to a user based on the new configurations that improved the criticality ratings of the vulnerabilities of the vulnerability expansion model (process 310).

Figure 7:
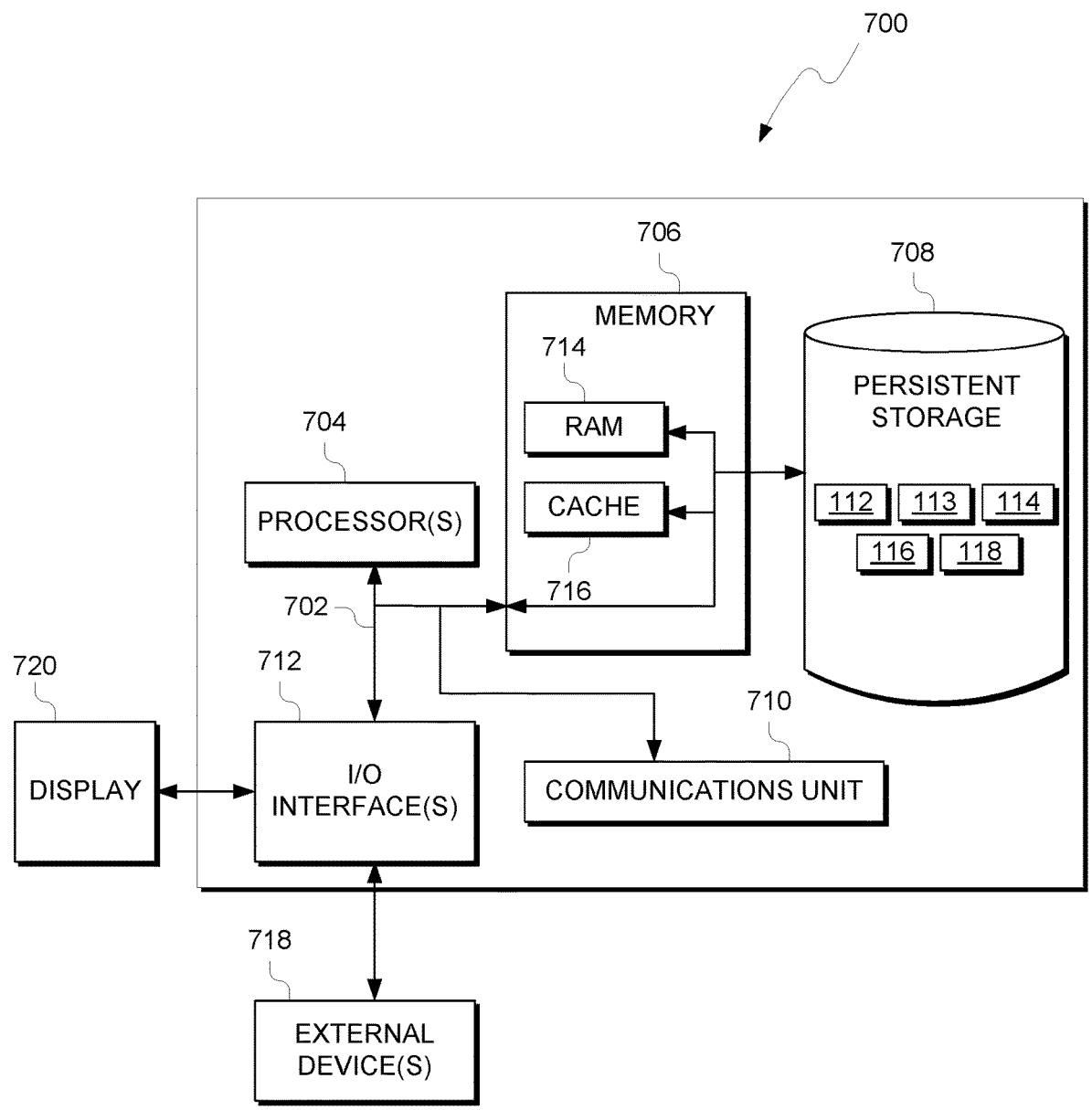
FIG. 7 depicts a block diagram of components of the computing device executing a simulation program, in accordance with an exemplary embodiment of the present invention.

FIG. 7 depicts a block diagram, 700, of components of computing device 110, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 110 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Simulation program 112, model module 113, propagation module 114, infrastructure data 116 and vulnerability data 118 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 120. In these examples, communications unit 710 includes one or more network interface cards. Communications unit 710 may provide communications through the use of either or both physical and wireless communications links. Simulation program 112, model module 113, propagation module 114, infrastructure data 116 and vulnerability data 118 may be downloaded to persistent storage 708 through communications unit 710.

I/O interface(s) 712 allows for input and output of data with other devices that may be connected to computing device 110. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., simulation program 112, model module 113, propagation module 114, infrastructure data 116 and vulnerability data 118, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
   receiving, by one or more processors, network infrastructure data regarding a network;
   identifying, by the one or more processors, a plurality of vulnerabilities associated with one or more components of the network;
   generating, by the one or more processors, an architecture model based, at least in part, on the network infrastructure data and the plurality of vulnerabilities;
   generating, by the one or more processors, a vulnerability expansion model based, at least in part, on the architecture model;
   determining, by the one or more processors, a vulnerability expansion based, at least in part, on the vulnerability expansion model and at least one vulnerability of plurality of vulnerabilities being compromised;
   determining, by the one or more processors, a criticality rating for at least one vulnerability of the plurality of vulnerabilities based, at least in part, on an amount of additional vulnerabilities the compromised vulnerability provides access;
   determining, by the one or more processors, a new configuration of at least one component of the one or more components of the network;
   determining, by the one or more processors, a new criticality rating for the at least one vulnerability; and
   in response to the new criticality rating being less than the criticality rating for the at least one vulnerability of the plurality of vulnerabilities, generating, by the one or more processors, a suggestion to change the at least one component based on the new configuration.

2. The method of claim 1, wherein the criticality rating is further based, at least in part, on one or more of the following: (i) an intrinsic criticality of a resource associated with the at least one vulnerability; (ii) a detectability of the at least one vulnerability; (iii) a degree of extent that the resource associated with the at least one vulnerability is able to be compromised; and (iv) a difficulty to exploit the at least one vulnerability.

3. The method of claim 1, wherein the architecture model includes nodes for one or more of the following network components: (i) network zones, (ii) firewalls, (iii) devices of the network, and (iv) vulnerabilities associated with at least one device of the network.

4. The method of claim 1, wherein directed paths of the architecture model are based, at least in part, on network zones and one or more firewall rules.

5. The method of claim 1, the method further comprising:
   determining, by the one or more processors, at least on vulnerability of the plurality of vulnerabilities based, at least in part, on at least one configuration of a component of the network.

6. A computer program product comprising:
   one or more computer-readable storage media and program instructions stored on the one or more computer-readable storage media, the program instructions comprising:
   program instructions to receive network infrastructure data regarding a network;
   program instructions to identify a plurality of vulnerabilities associated with one or more components of the network;
   program instructions to generate an architecture model based, at least in part, on the network infrastructure data and the plurality of vulnerabilities;
   program instructions to generate a vulnerability expansion model based, at least in part, on the architecture model;
   program instructions to determine a vulnerability expansion based, at least in part, on the vulnerability expansion model and at least one vulnerability of plurality of vulnerabilities being compromised;
   program instructions to determine a criticality rating for at least one vulnerability of the plurality of vulnerabilities based, at least in part, on an amount of additional vulnerabilities the compromised vulnerability provides access;

program instructions to determine a new configuration of at least one component of the one or more components of the network;

program instructions to determine a new criticality rating for the at least one vulnerability; and in response to the new criticality rating being less than the criticality rating for the at least one vulnerability of the plurality of vulnerabilities, program instructions to generate a suggestion to change the at least one component based on the new configuration.

7. The computer program product of claim 6, wherein the criticality rating is further based, at least in part, on one or more of the following: (i) an intrinsic criticality of a resource associated with the at least one vulnerability; (ii) a detectability of the at least one vulnerability; (iii) a degree of extent that the resource associated with the at least one vulnerability is able to be compromised; and (iv) a difficulty to exploit the at least one vulnerability.

8. The computer program product of claim 6, wherein the architecture model includes nodes for one or more of the following network components: (i) network zones, (ii) firewalls, (iii) devices of the network, and (iv) vulnerabilities associated with at least one device of the network.

9. The computer program product of claim 6, wherein directed paths of the architecture model are based, at least in part, on network zones and one or more firewall rules.

10. The computer program product of claim 6, the program instructions further comprising:

program instructions to determine at least on vulnerability of the plurality of vulnerabilities based, at least in part, on at least one configuration of a component of the network.

11. A computer system comprising:

one or more computer processors;

one or more computer readable storage media; and program instructions stored on the computer readable storage media for execution by at least one of the one or more processors, the program instructions comprising:

program instructions to receive network infrastructure data regarding a network;

program instructions to identify a plurality of vulnerabilities associated with one or more components of the network;

program instructions to generate an architecture model based, at least in part, on the network infrastructure data and the plurality of vulnerabilities;

program instructions to generate a vulnerability expansion model based, at least in part, on the architecture model;

program instructions to determine a vulnerability expansion based, at least in part, on the vulnerability expansion model and at least one vulnerability of plurality of vulnerabilities being compromised;

program instructions to determine a criticality rating for at least one vulnerability of the plurality of vulnerabilities based, at least in part, on an amount of additional vulnerabilities the compromised vulnerability provides access;

program instructions to determine a new configuration of at least one component of the one or more components of the network;

program instructions to determine a new criticality rating for the at least one vulnerability; and in response to the new criticality rating being less than the criticality rating for the at least one vulnerability of the plurality of vulnerabilities, program instructions to generate a suggestion to change the at least one component based on the new configuration.

12. The computer system of claim 11, wherein the criticality rating is further based, at least in part, on one or more of the following: (i) an intrinsic criticality of a resource associated with the at least one vulnerability; (ii) a detectability of the at least one vulnerability; (iii) a degree of extent that the resource associated with the at least one vulnerability is able to be compromised; and (iv) a difficulty to exploit the at least one vulnerability.

13. The computer system of claim 11, wherein the architecture model includes nodes for one or more of the following network components: (i) network zones, (ii) firewalls, (iii) devices of the network, and (iv) vulnerabilities associated with at least one device of the network.

14. The computer system of claim 11, wherein directed paths of the architecture model are based, at least in part, on network zones and one or more firewall rules.

* * * * *